(12) United States Patent
Chun et al.

(10) Patent No.: US 10,795,830 B2
(45) Date of Patent: Oct. 6, 2020

(54) WRITE ACCESS CONTROL FOR DOUBLE DATA RATE WRITE-X/DATACOPY0 COMMANDS

(71) Applicant: QUALCOMM Incorporated, San Diego, CA (US)

(72) Inventors: Dexter Tamio Chun, San Diego, CA (US); Yanru Li, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 153 days.

(21) Appl. No.: 16/041,645

(22) Filed: Jul. 20, 2018

(65) Prior Publication Data

US 2020/0026667 A1    Jan. 23, 2020

(51) Int. Cl.
*G06F 12/14* (2006.01)
*G06F 21/79* (2013.01)
*G11C 8/10* (2006.01)

(52) U.S. Cl.
CPC .......... *G06F 12/1483* (2013.01); *G06F 21/79* (2013.01); *G11C 8/10* (2013.01); *G06F 2212/1052* (2013.01); *G06F 2221/2141* (2013.01)

(58) Field of Classification Search
CPC .............. G11C 8/10; G06F 2212/1052; G06F 2221/2141
See application file for complete search history.

(56) References Cited

U.S. PATENT DOCUMENTS

| | | | |
|---|---|---|---|
| 7,243,254 B1 * | 7/2007 | Kuroodi | G06F 13/1694 711/167 |
| 9,076,514 B2 | 7/2015 | Seo | |
| 9,383,809 B2 | 7/2016 | Chun et al. | |
| 9,934,827 B2 | 4/2018 | Wu et al. | |
| 9,997,214 B1 | 6/2018 | Kumar et al. | |
| 2009/0282211 A1 * | 11/2009 | Hoover | G06F 12/1483 711/173 |
| 2013/0346684 A1 * | 12/2013 | Bains | G11C 7/1045 711/105 |
| 2014/0006737 A1 * | 1/2014 | Teh | G06F 12/1475 711/163 |
| 2017/0255406 A1 * | 9/2017 | Tomishima | G11C 16/20 |
| 2018/0137050 A1 | 5/2018 | Jain et al. | |
| 2018/0181344 A1 * | 6/2018 | Tomishima | G11C 7/1015 |

* cited by examiner

*Primary Examiner* — William E. Baughman
(74) *Attorney, Agent, or Firm* — Muncy, Geissler, Olds & Lowe, P.C.

(57) ABSTRACT

In conventional memory systems, no access control is performed when write-x and datacopy0 are issued. To address this issue, it is proposed to provide access control to these commands by leveraging the mechanism to enforce access control to normal write commands so that the mechanism is also applied to the write-x and datacopy0 commands.

37 Claims, 9 Drawing Sheets

WRITE ACCESS CONTROL FOR DOUBLE DATA RATE WRITE-X/DATACOPY0 COMMANDS

FIELD OF DISCLOSURE

One or more aspects of the present disclosure generally relate to memory systems, and in particular, to support write access control for write commands that either do not go through the traditional data access path, or rely on a new combination of data and control paths, e.g., write-x and datacopy0 in memory devices.

BACKGROUND

JEDEC (Joint Electron Device Engineering Council) promulgates several standards including the LPDDR5 (Low Power Double Data Rate 5) standard (still in discussion) for mobile storage devices. The LPDDR5 standard introduced new methods to write a large number of constant values, e.g., zeros, to the DRAM (Dynamic Random Access Memory) device instead of normal data path access. Write-x and datacopy0 functions are examples of such alternative write features. Using these new functions can reduce energy.

One or both of write-x and datacopy0 functions may be optional features in a LPDDR5 device. A LPDDR controller can detect whether the write-x and/or the datacopy0 functions are supported by performing an MRR (Mode Register Read) of a mode register (e.g., MRR of MR21 OP[2] for write-x, MRR of MR[21] OP1 for datacopy0. If the LPDDR5 device supports the write-x and/or the datacopy0, the LPDDR5 controller can enable the functions by setting appropriate bits (e.g., MR21 OP[6] for write-x, MR21 OP[5] for datacopy0) with MRW (Mode Register Write) commands.

The write-x function can be initiated through a CAS (Column Address Select) command followed with an appropriate write command. For LPDDR5, the WRX enable is sticky, meaning that all subsequent writes will employ write-x until a new CAS command clears WRX. However, in other embodiments the WRX (or equivalent) can be auto-cleared upon completion. Table 1 below illustrates an example CAS command with followed with a write command to write zeros.

TABLE 1

| CMD | CS | CA0 | CA1 | CA2 | CA3 | CA4 | CA5 | CA6 | CK |
|---|---|---|---|---|---|---|---|---|---|
| CAS | H | L | L | H | H | V | V | V | R1 |
|  | X | V | V | V | V | WRX = 1 | V | V | F1 |

The datacopy0 function can also be initiated through a CAS command followed with an appropriate write command. For LPDDR5, the DC0, DC1, DC2, and DC3 bits are transient (not sticky), meaning that only the immediate write following the CAS command will employ datacopy0. However, in other embodiments the DC bits (or equivalent) may be sticky. Table 2 below illustrates an example CAS command with the datacopy0 bits DC0, DC1, DC2, and DC3.

TABLE 2

| CMD | CS | CA0 | CA1 | CA2 | CA3 | CA4 | CA5 | CA6 | CK |
|---|---|---|---|---|---|---|---|---|---|
| CAS | H | L | L | H | H | V | V | V | R1 |
|  | X | DC0 | DC1 | DC2 | DC3 | WRX = 1 | V | V | F1 |

The nature of the write-x command is different than a normal write command in that the constant values, e.g., zeros, are not transmitted to the DRAM. Instead, a brief single write-x CAS command followed with a write command instructs the DRAM to internally perform the write. Unfortunately, this means that the traditional methods that exist to block a write access to a secure portion of the DRAM may no longer work for write-x.

The nature of the datacopy0 command is also different than a normal write command in that if the values of the data residing on data lanes DQ1 through DQ7 match the value of DQ0, then only data lane DQ0 is transmitted. Similarly, if the values of the data residing on data lanes DQ9 through DQ15 match the value of DQ8, then only data lane DQ8 is transmitted. When this occurs, the values of DQ1 through DQ7 are reconstructed from DQ0, and the values of DQ9 through DQ15 are reconstructed from DQ8. The CAS command precedes the write command to indicate when during a burst transfer these values match, and the SoC (System-on-Chip) only transmits data on DQ0 and DQ8 for those portions when matching occurs. Unfortunately, this also means that the traditional methods that exist to block a write access to a secure portion of the DRAM may no longer work for datacopy0.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary apparatus is disclosed. The apparatus may be selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and an automotive vehicle. The apparatus may include an execution engine access (EE) controller and a DRAM controller. The EE controller may be configured to receive an indirect access command. The indirect access command may be a command to access a DRAM device and in which at least a part of the command is received on a path other than on a data path. The EE controller may also be configured to translate a target address of the indirect access command. The DRAM controller may further be configured to determine whether to allow or block the indirect access command based on the translated target address, transmit the indirect access command to the DRAM device when it is determined that the indirect access command is to be allowed, and block the indirect access command from being transmitted to the DRAM device when it is determined that the indirect access command is to be blocked. The DRAM device may be coupled to the apparatus over a DRAM link. The indirect access command may be transmitted over the DRAM link when it is determined that the indirect access command is to be allowed.

An exemplary method is disclosed. The method may comprise acts performed by an execution engine access (EE) controller and a DRAM controller of a host. The acts performed by the EE controller may include receiving an indirect access command. The indirect access command may be a command to access a DRAM device and in which at least a part of the command is received on a path other than on a data path. The acts performed by the EE controller may also include translating a target address of the indirect access command Acts performed by the DRAM controller may include determining whether to allow or block the indirect access command based on the translated target address, transmitting the indirect access command to a DRAM device when it is determined that the indirect access command is to be allowed, and blocking the indirect access command from being transmitted to the DRAM device when it is determined that the indirect access command is to be blocked. The DRAM device may be coupled to the apparatus over a DRAM link. The indirect access command may be transmitted over the DRAM link when it is determined that the indirect access command is to be allowed.

Another exemplary apparatus is disclosed. The apparatus may comprise an execution engine access (EE) controller and a DRAM controller. The EE controller may comprise means for receiving an indirect access command. The indirect access command may be a command to access a DRAM device and in which at least a part of the command is received on a path other than on a data path. The EE controller may also comprise means for translating a target address of the indirect access command, which may be expressed on the control path data bus. The DRAM controller may comprise means for determining whether to allow or block the indirect access command based on the translated target address, means for transmitting the indirect access command to the DRAM device when it is determined that the indirect access command is to be allowed, and means for blocking the indirect access command from being transmitted to the DRAM device when it is determined that the indirect access command is to be blocked. The DRAM device may be coupled to the apparatus over a DRAM link. The indirect access command may be transmitted over the DRAM link when it is determined that the indirect access command is to be allowed.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
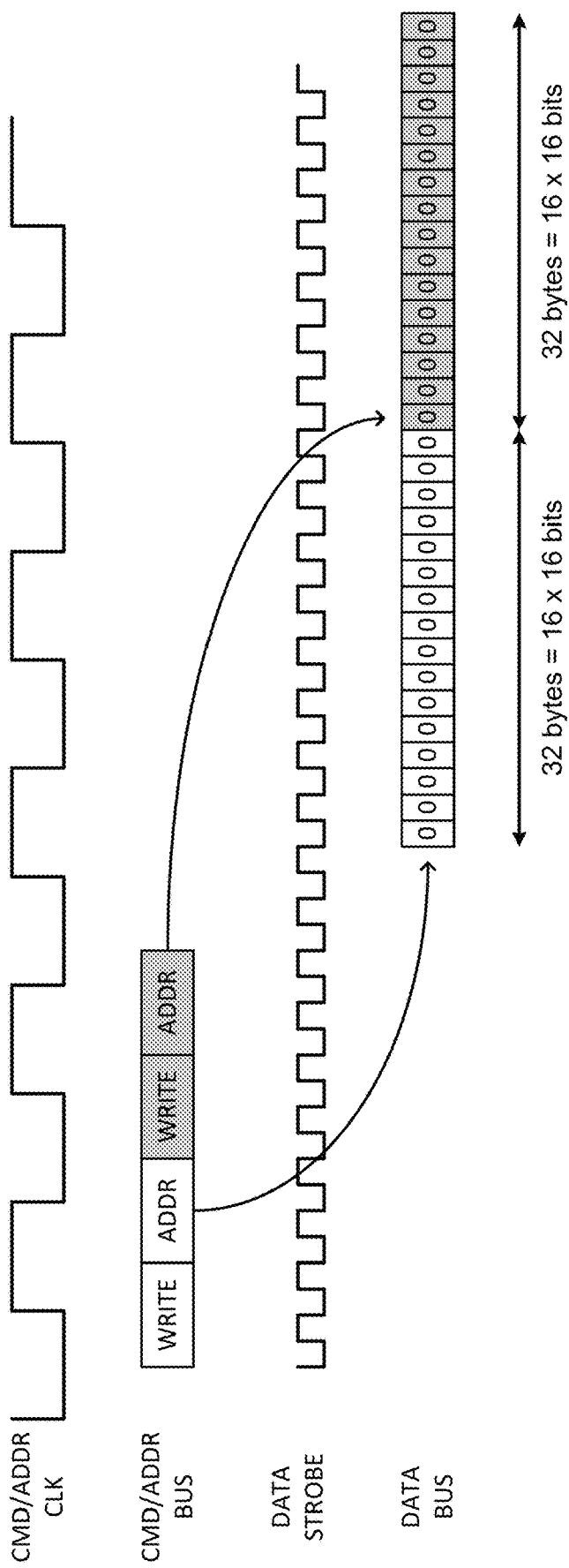
FIG. 1 illustrates a normal write transaction to write a repeating pattern to a DRAM device.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Recall from above that unlike normal write commands, the write-x and datacopy0 commands may be used to write a large number of constant values, e.g., zeros, to a DRAM device (e.g., an LPDDR5 DRAM) instead of sending normal write commands with repeated data on the normal data path. An advantage of the write-x and datacopy0 commands is that a special command may be used to instruct the DRAM device to internally perform writes without transmitting any data (e.g., write-x) or while transmitting a small fraction of the data (e.g., datacopy0) between the SoC and DRAM device. As a result, these commands offer a way to economically fill a DRAM device with constant values (e.g., zeros) using less energy and less bus bandwidth, thus resulting in better performance.

Unfortunately, this also means that the traditional methods that exist to block a write access to a secure portion of the DRAM device may no longer work and/or work inefficiently. This is because both write-x and datacopy0 writes require intervention of the control information, specifically the CAS command to precede the write, and of the data information, specifically the values to be written which are removed from the transmission (saving power). Thus, it would be advantageous to enforce access control to the DRAM device while using commands such as the write-x and datacopy0 commands. In this way, protected memory space can be prevented from being corrupted inadvertently or on purpose.

FIG. 1 illustrates a normal write transaction to write a repeating pattern, such as zeros, e.g., to the DRAM device. In this instance, two write commands are issued. For each normal write, the data values (e.g., 32 bytes of data) are presented on the data bus to be written to the corresponding specified address. For normal writes, the host (e.g., SoC (system-on-chip)) can block the entire transaction (or not). Thus, if the writes are addressed to an unauthorized space in memory, the writes can be prevented to protect the secure space from being overwritten.

Figure 2:
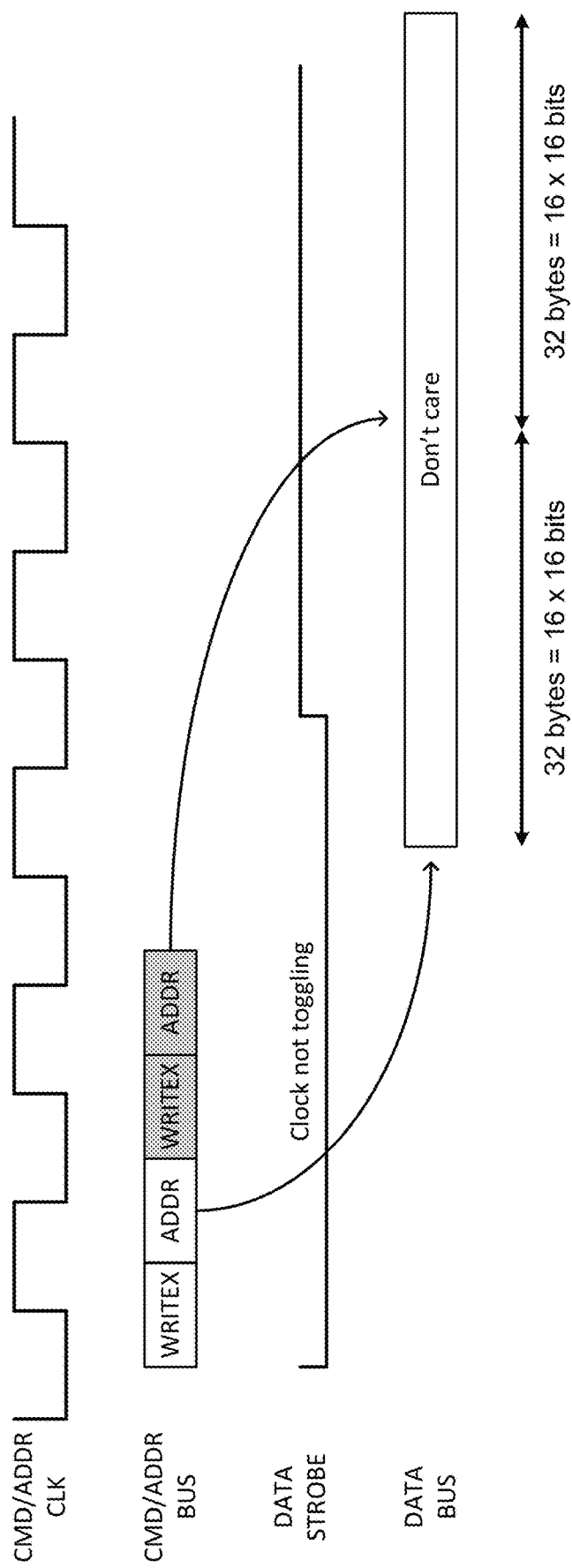
FIG. 2 illustrates a conventional write-x transaction to write a repeating pattern to a DRAM device.

FIG. 2 illustrates a write-x transaction to write a repeating pattern to a DRAM device. In this instance, the data values are NOT presented on the data bus. Indeed, the data strobe does not toggle, and any data on the data bus are ignored. In short, the write-x transaction does not present the data through the memory controller. Instead, the host instructs the memory controller to issue the write-x command sequence. This difference means that the traditional mechanism to protect the secure space from being overwritten will no longer be effective.

Figure 3:
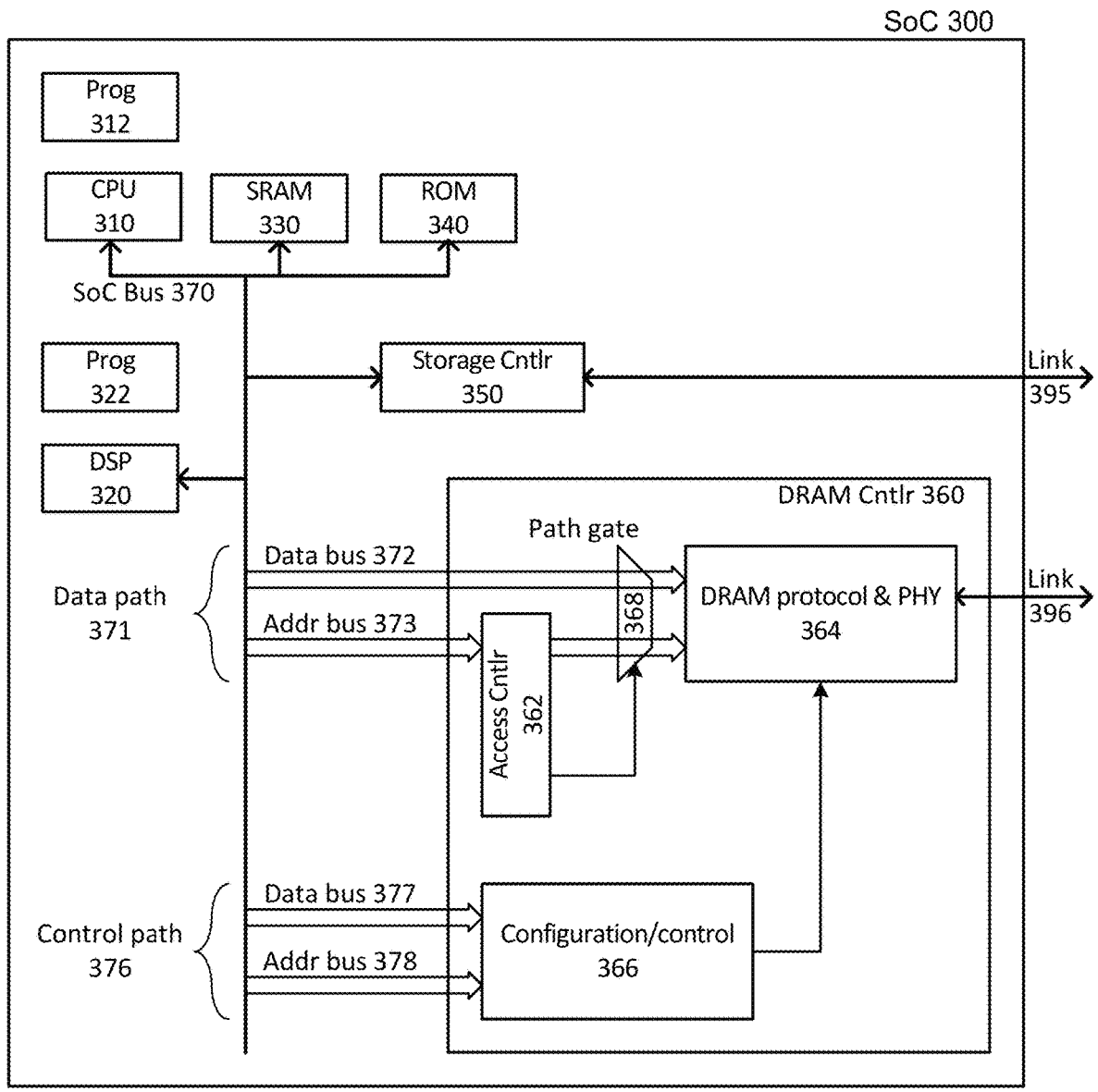
FIG. 3 illustrates a diagram of an apparatus that implements a conventional access control.

FIG. 3 illustrates a diagram of a SoC 300 that implements a conventional access control. The SoC 300 includes a CPU 310 executing a program 312, a DSP 320 executing a program 322, an SRAM 330, a ROM 340, a storage controller 350, and a DRAM controller 360. The storage controller 350 controls access to a storage device (not shown) coupled to the SoC 300 through a storage link 395. The DRAM controller 360 controls access to a DRAM device (not shown) coupled to the SoC 300 through a DRAM link 396. The CPU 310, the DSP 320, the SRAM 330, the ROM 340, the storage controller 350, and the DRAM controller 360 are all connected to each other through a SoC bus 370.

The DRAM controller 360 includes an access controller 362, a path gate 368, a DRAM protocol & PHY 364, and a configuration controller 366. The access controller 362 performs access control by enabling/disabling the path gate 368 to allow/block access to the DRAM device coupled to the SoC 300 through the DRAM link 396. The DRAM controller 360 is coupled to the SoC bus 370 through the data path 371 (also referred to as the data plane) and the control path 376 (also referred to as the control plane). The data path 371 includes data bus 372 and address bus 373. The control path 376 also includes data bus 377 and address bus 378. The data and control paths 371, 376 may physically be same paths, i.e., the data buses 372, 377 may be the same and the address buses 373, 378 may be same.

However, the data and control paths 371, 376 are logically different in the following sense. Typically, the control path 376 is used to access the configuration registers of the DRAM controller 360 to control characteristics such as hardware initialization, security settings, memory device settings, operational modes, power management, and clock frequency. Thus, in FIG. 3, the control path 376 is shown as being coupled to the configuration controller 366.

On the other hand, access to the DRAM device is traditionally performed through the data path 371, for example, to perform read and write operations. As seen, there is no path to access the DRAM device (through the DRAM link 396) other than the data path 371. The data path 371 is coupled to the access controller 362 and the path gate 368. The access controller 362 uses the address bus 373 as input, possibly together with other indication including security domain indication (e.g., ns bus in TrustZone design), to perform access control. This is analogous to a person entering a secure facility where similar inputs such as room location (memory address and size) and identity (memory access domain) determine whether access is granted or denied. Access control may include more advanced, additional conditions such as inheritance, time, payment/credit, etc. The access controller 362 may incorporate a minimal or comprehensive set of these criteria.

For example, if the CPU 310 issues a normal write command to access the DRAM device, the data value would appear on the data bus 372 and the target address location would appear on the address bus 373. If the target location is a protected location, i.e., an area of the DRAM device that the CPU 310 is not authorized to access, then the access controller 362 can disable the path gate 368, and the DRAM protocol & PHY 364 would be blocked from issuing the CPU's write command to the DRAM device. On the other hand, if the access controller 362 determines that access to the specified location is allowed, then access controller 362 can enable the path gate 368, and the DRAM protocol & PHY 364 would issue the CPU's write command to the DRAM device.

However, if the CPU 310 issues a write-x or a datacopy0 command, the command would appear on the control path 376, which bypasses the access controller 362. In this instance, the write-x or the datacopy0 command would be issued to the DRAM device through the DRAM protocol & PHY 364. The result is that the protected area of the DRAM device can be overwritten inadvertently.

Figure 4:
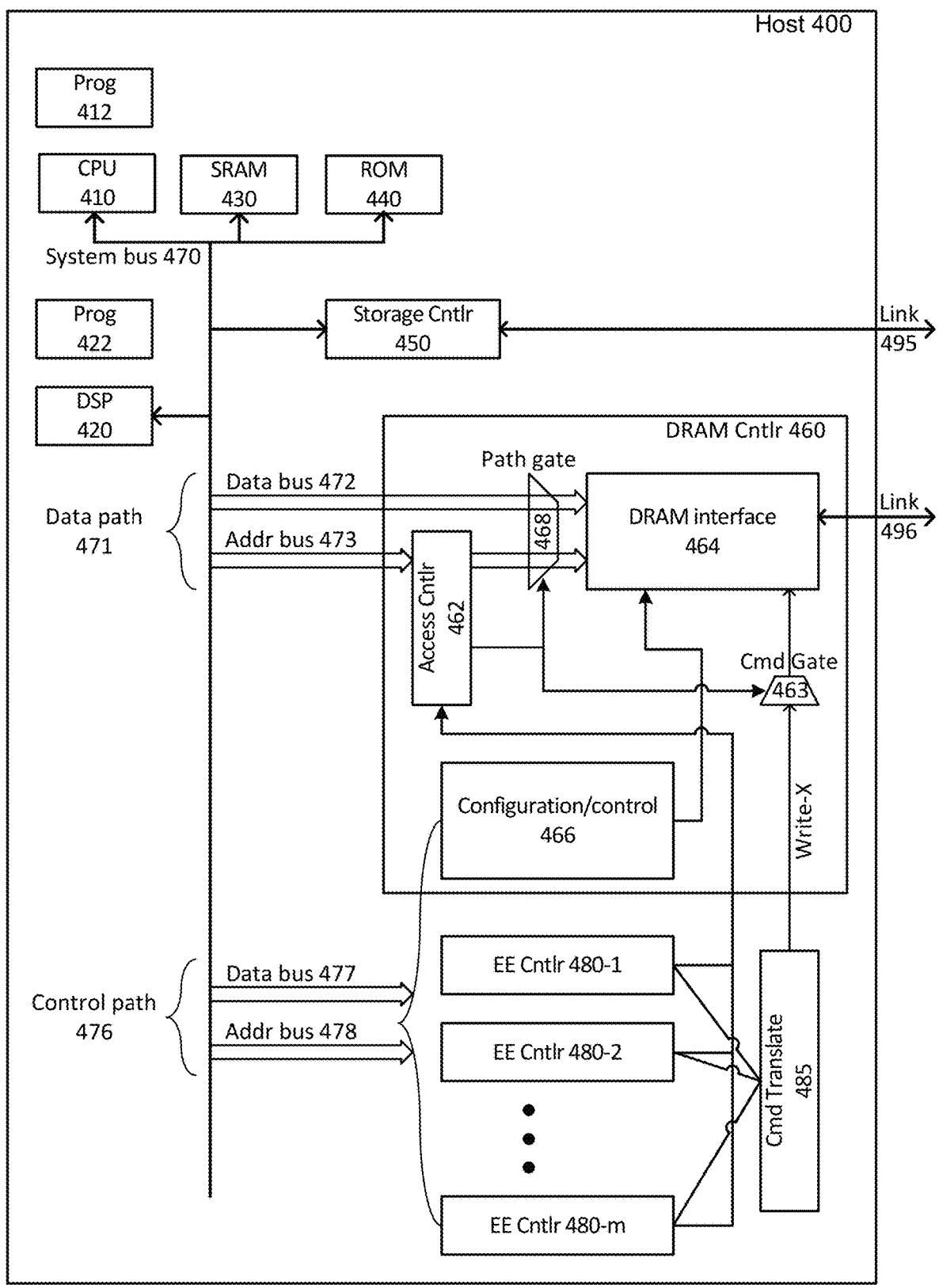
FIG. 4 illustrates a diagram of an apparatus that implements a proposed access control according to a non-limiting embodiment.

FIG. 4 illustrates a diagram of an apparatus, e.g., a host 400 that implements an access control mechanism that addresses the one or more short comings of the conventional access control implemented by the conventional SoC 300. The host 400 may be a SoC or a combination of ICs. The host 400 may include a CPU 410 executing a program 412, a DSP 420 executing a DSP program 422, an SRAM 430, a ROM 440, a storage controller 450, and a DRAM controller 460. The CPU 410, the DSP 420, the SRAM 430, the ROM 440, the storage controller 450, and the DRAM controller 460 may be coupled to each other through a system bus 470 such as a SoC bus. The storage controller 450 may be configured to control access to a storage device (not shown) coupled to the host 400 through a storage link 495. The DRAM controller 460 may be configured to control access to a DRAM device (not shown) coupled to the host 400 through a DRAM link 496. The DRAM device may be an LPDDR device. In an aspect, the DRAM link 496 may be a die-to-die link such that the host 400 and the DRAM device may be incorporated in a single device.

The CPU 410 may be a multi-core processor. Indeed, there may be a plurality of processors. In this disclosure, the CPU 410 is used to generically represent the various combinations of processing devices that the host 400 may include. The CPU 410 and the DSP 420 may be configured to access the DRAM device through the DRAM controller 460. While not shown, it is contemplated that the host 400 may incorporate other devices also configured to access the DRAM device through the DRAM controller 460. For example, the host 400 may include GPU(s) and/or multimedia engine(s).

The DRAM controller 460 may include an access controller 462, a path gate 468, a DRAM interface 464, and a configuration controller 466. The access controller 462 may be configured to perform access control on a data path 471 (e.g., for normal write commands) by enabling/disabling the path gate 468 to allow/block access to the DRAM device coupled to the host 400 through the DRAM link 496. The data path 471 may also be referred to as the data plane 471.

A memory bus may be an example of the link 496 configured to couple the host 400 with the DRAM device (e.g., LPDDR device). The memory bus may include, among others, a plurality of data (DQ) lanes (e.g., DQ0-DQn where n is a positive integer), a clock (CLK) lane, a plurality of command lanes, a plurality of address lanes, and a data strobe (DS) lane. The command and address lanes may together be referred to as CA lanes. The transactions illustrated in FIGS. 1 and 2 may occur on the lanes of the memory bus.

The DRAM controller 460 may also include a command gate 463. In a non-limiting aspect, the access controller 462 may also be configured to perform access control on a control path 476 (e.g., for write-x, datacopy0 commands) by enabling/disabling the command gate 463 to allow/block access to the DRAM device. The control path 476 may also be referred to as the control plane 476.

The DRAM controller 460 may be coupled to the system bus 470 through the data and/or the control paths 471, 476. The data path 471 may include a data bus 472 and an address bus 473. The control path 476 may include a control path data bus 477 and an address bus 478. To more easily distinguish, the buses 472, 473 will be prefixed with "data path" and the buses 477, 478 will be prefixed with "control path". The data and control paths 471, 476 may physically be same or different paths. That is, the data path data bus 472 and the control path data bus 477 may physically be the same or different. Also, the data path address bus 473 and the control path address bus 478 may physically be the same or different.

However, the data and control paths 471, 476 are treated different logically in a manner similar to the circumstance described above with respect to the conventional SoC 300 of FIG. 3. For example, in FIG. 4, access to the DRAM device may be performed through the data path 471 to perform normal read and write operations. The data path 471 may be coupled to the access controller 462 and the path gate 468. For normal writes, the access controller 462 may use the data path address bus 473 as input, possibly together with other indication including security domain indication (e.g., ns bus in TrustZone design), to perform access control. In short, the access control on the data path 471 remains.

Recall that in the conventional SoC 300, a command on the control path 376 (e.g., write-x, datacopy0) bypasses the access controller 362. Therefore, access control on the control path 376 is not possible in the conventional SoC 300. But unlike the conventional SoC 300, access control on the control path 476 is made possible in the host 400. In an aspect, the access policy configuration may be synchronized on the data path 471 and on the control path 476. As seen in FIG. 4, the host 400 may include one or more execution engine access (EE) controllers 480 (e.g., EE controller 480-1, EE controller 480-2, ..., EE controller 480-m, where m is an integer ≥1) and a command translator 485. Each EE controller 480-k, k=1 ... m, may be implemented in any combination of hardware, software, and firmware. However, for performance purposes, the hardware implementations may be preferred.

Terms "indirect access command" and "direct access command" will be used to distinguish commands such as write-x and datacopy0 from normal write commands. As will be made clear from the description below, an indirect access command may be viewed as a command to access memory such as the DRAM device, and in which at least a part of the command is on a path other than the data path 471. The indirect access command may be viewed as existing, at least in part, in the control plane. On the other hand, for a direct access command, the address and data are all are on the data path 471, i.e., exist in the data plane. To state it another way, the access controller 362 can be directly engaged for performing access control on direct access commands, but is indirectly engaged for performing access control on indirect access commands.

On the input side, the EE controllers 480 may be coupled to the control path 476. On the output side, the EE controllers 480 may be coupled to the access controller 462 and to the command translator 485. Internally, for indirect access commands (e.g., write-x, datacopy0), the target address may be expressed on the control plane. In an aspect, the target address may be expressed on the control path data bus 477 instead of the control path address bus 478. Each of the EE controllers 480 may be configured to translate the address provided on the control path data bus 477. Each of the EE controllers 480 may also be configured to provide the translated address to the access controller 462. Data on the control path address bus 478 may be used to indicate or otherwise determine which EE controller 480-k, k=1 m will perform the address translation.

The EE controllers 480 may also be configured to couple with the command translator 485. In an aspect, the command translator 485 may be configured to prepare the appropriate indirect access command (e.g., write-x, datacopy0, etc.), e.g., for transmission to the DRAM device, based on the output of the EE controllers 480. The prepared command may be provided to the command gate 463.

From the perspective of the access controller 462, the translated target address from the EE controller 480-k may be treated as if the translated address is presented on the data path address bus 473 of the data path 471. Using the translated address as input, possibly together with other indication including security domain indication (e.g., ns bus in a TrustZone design), the access controller 462 may perform access control by enabling/disabling the command gate 463 to allow/block access to the DRAM device. In other words, the existing mechanism to perform access control on the data path 471 may be leveraged to perform access control on the control path 476.

For example, if the translated address from the EE controller 480-k is to a protected, i.e., a disallowed area of the DRAM device for the particular access domain identified by the EE controller 480-k, the access controller 462 may disable the command gate 463 to block the indirect access command (e.g., prepared by the command translator 485) from reaching the DRAM interface 464. This in turn prevents the command from being issued to the DRAM device. On the other hand, if the translated address is to an area allowed for the particular access domain identified by the EE controller 480-k, the access controller 462 may enable the command gate 463 to allow the prepared command output by the command translator 485 to reach the DRAM interface 464 and eventually issued to the DRAM device.

Figure 5:
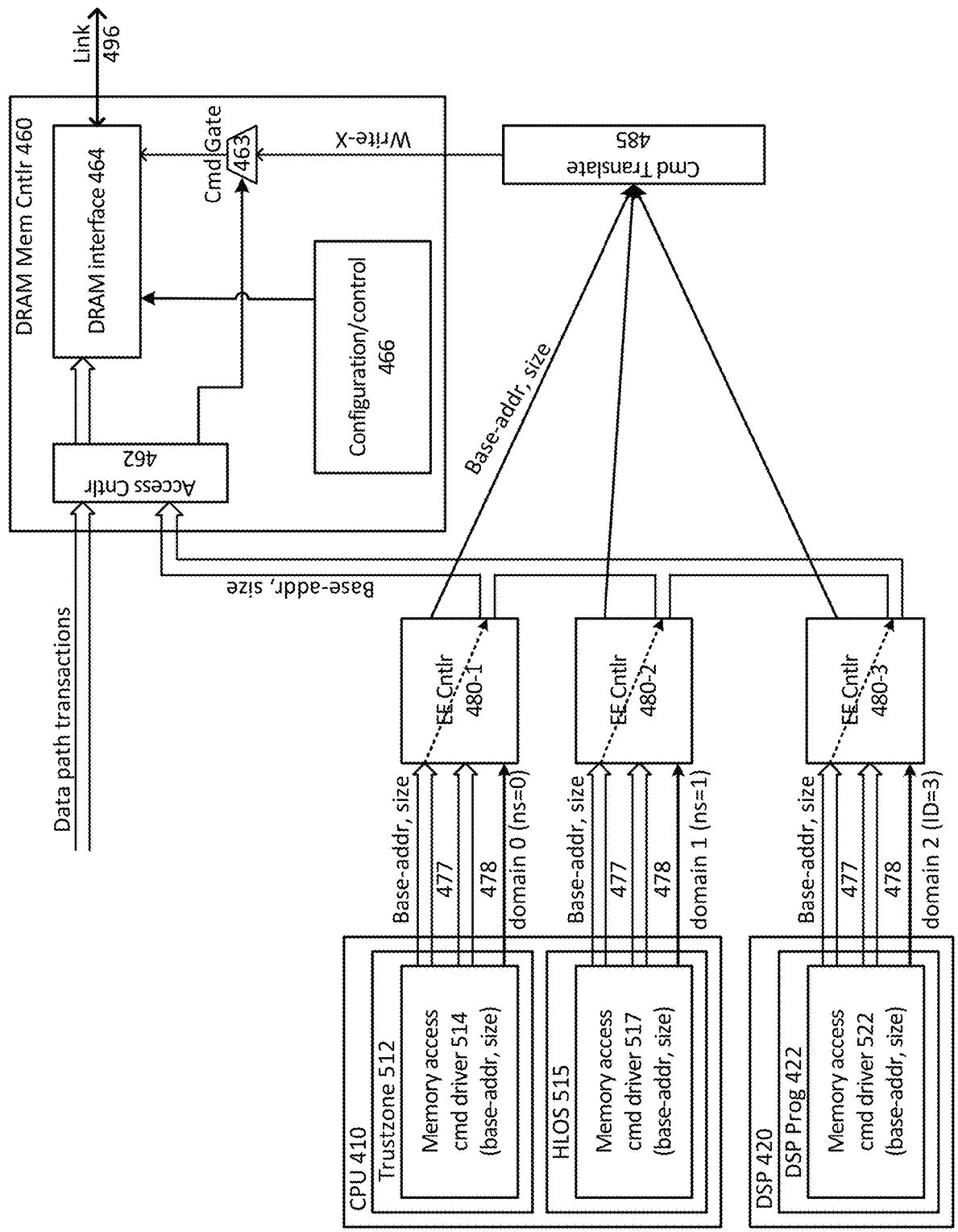
FIG. 5 illustrates a diagram of the apparatus of FIG. 4 focusing on those elements involved in performing the proposed access control.

FIG. 5 illustrates a diagram of the apparatus of FIG. 4 with a focus on those elements involved in performing the proposed access control on the control path 476. One of the keys of the proposed access control is that data expressed on the control path data bus 477 (the target address) is translated to an address for presentation to the access controller 462, which then can be blocked/allowed.

Note that whether writes to an area of the DRAM device is allowed or not may depend on the context in which the write access is requested. Recall that the CPU 410 and the DSP 420 are non-limiting examples of devices configured to access the DRAM device through the DRAM controller 460. The allowed area corresponding to each of the devices may be different from each other. That is, an area of the DRAM device allowed to be manipulated by the CPU 410 may be different from an area allowed to be manipulated by the DSP 420. Even within one accessing device, the allowed areas may differ from one moment to the next.

In FIG. 5, the CPU 410 is illustrated as operating between two contexts. That is, the CPU 410 may switch back and forth between operating in a TrustZone 512 and in an HLOS (High Level Operating System). Also, the DSP 420 is illustrated as operating in one context—the DSP program 422. In an aspect, there may be a memory access command driver associated with each context. For example, the CPU 410 may utilize the memory access command driver 514 to issue an indirect access command (e.g., write-x, datacopy0, etc.) when operating in the TrustZone 512, and may utilize the memory access command driver 517 to issue the indirect access command when operating in the HLOS 515. The DSP 420 may utilize the memory access command driver 522 to issue the indirect access command when operating in the DSP program 422.

As indicated, the allowed area corresponding to each context may be different from all other contexts. For example, assume that each of the contexts for TrustZone 512, the HLOS 515, and the DSP program 422 are each allocated different non-overlapping portions of the DRAM device for exclusive use by the corresponding context. In this instance, each of the contexts should be prevented from writing to the portions of the DRAM device exclusively allocated to other contexts. For example, if the CPU 410 operating in the TrustZone 512 issues a write-x command (through the memory access command driver 514), and if the target address (translated by the EE controller 480-1) touches upon any of the portions allocated to the HLOS 515 or the DSP program 422, then the access controller 462 may disable the command gate 463 such that the DRAM interface 464 is prevented from issuing the write-x command to the DRAM device.

The target address on the control path data bus 477 (of the control path 476) may comprise a base address and size so that a range of addresses may be expressed. Alternatively, the target address may comprise start and end addresses. Mode may also be indicated. The translated address from the EE controllers 480 may also comprise base address and size, or alternatively, start and end addresses. The command translator 485 may use the translated address to prepare the appropriate command (e.g., to specify the equivalent address range). If the access controller 462 determines that any portion of the translated range of addresses is to a disallowed area, the access controller 462 may disable the command gate 463.

Value on the control path address bus 478 may be used to determine which EE controller 480-$k$ will perform the address translation. Alternatively or in addition thereto, the access domain information (e.g., ns, ID) may be used to determine the translating EE controller 480-$k$. In an aspect, the memory access command driver 514, 517, 522 may respectively output value on the control path address bus 478 (of the control path 476) and/or the access domain information to correspondingly select the EE controller 480-1, 480-2, 480-3 to perform the address translation.

Figure 6:
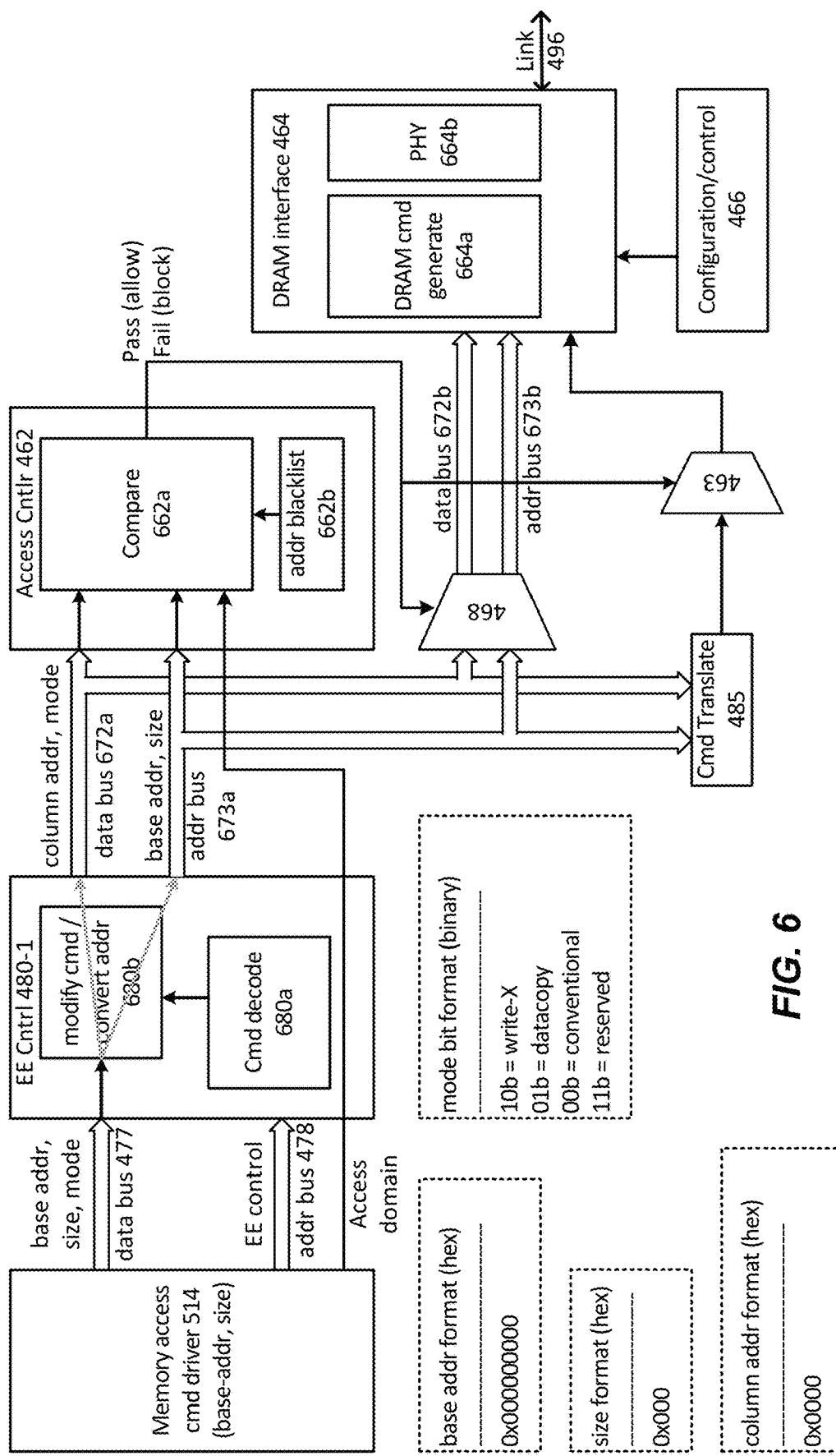
FIG. 6 illustrates a diagram detailing the implementation of the proposed access control.

FIG. 6 illustrates a diagram detailing an example implementation of the proposed access control. In FIG. 6, it is assumed that the CPU 410 is operating in the TrustZone 512 context. The memory access command driver 514 may issue an indirect access command (e.g., write-x, datacopy0) on the control path 476. In particular, the memory access command driver 514 may express a target address (e.g., base address, size, mode; alternatively start address, end address, mode) on the control path data bus 477. In an aspect, the mode may indicate the type of the command (e.g., write-x, datacopy0, conventional transaction). The memory access command driver 514 may also express a value on the control path address bus 478 and/or provide access domain information to select the EE controller 480-1. In other words, a context ID that corresponds to the TrustZone 512 may be one or both of the data on the control path address bus 478 and the access domain information.

The EE controller 480-1 may comprise a command decoder 680$a$ and a command/address converter 680$b$. The command decoder 680$a$ may be configured to decode the indirect access command received on the control path 476. The command/address converter 680$b$ may be configured to modify the decoded command and translate the target address received from the memory access command driver 514. The EE controller 480-1 may provide the modified command and the translated address to the access controller 462, e.g. via data and address buses 672$a$, 672$b$. The EE controller 480-1 may be representative of other EE controllers 480 to the extent that the other EE controllers 480 comprise similar components.

The access controller 462 may comprise a comparator 662$a$ and an address blacklist 662$b$. The address blacklist 662$b$ may be configured to store information regarding the allowed/disallowed areas corresponding to each of the contexts. The comparator 662$a$ may be configured to compare the translated target address from the EE controller 480-1 with the allowed/disallowed areas in the address blacklist 662$b$. Based on the comparison, the comparator 662$a$ may be configured to enable/disable the command gate 463. In so doing, the prepared command from the command translator 485 may be provided or blocked from being provided to the DRAM interface 464.

The DRAM interface 464 may comprise a DRAM command generator 664$a$ and a PHY interface 664$b$. The DRAM command generator 664$a$ may be configured to generate a DRAM command (e.g., write-x, datacopy0, etc.) in a protocol and format understandable by the DRAM device if and when the corresponding prepared command is received from the command translator 485, i.e., when the command gate 463 is enabled. The PHY interface 664$b$ may be configured to transmit the command generated by the DRAM command generator 664$a$ to the DRAM device. The DRAM command generator 664$a$ and/or the PHY interface 664$b$ may be configured to operate in compliance with one or more memory bus standards (e.g., DDR, DDR2, DDR3, DDR4, DDR5, LPDDR, LPDDR2, LPDDR3, LPDDR4, LPDDR5, etc.). To state it another way, the generated DRAM command may be transmitted over the DRAM link 496 in compliance with one or more of the memory bus standards. For example, if the write-x command is generated, the transaction may occur as illustrated in FIG. 2.

Figure 7:
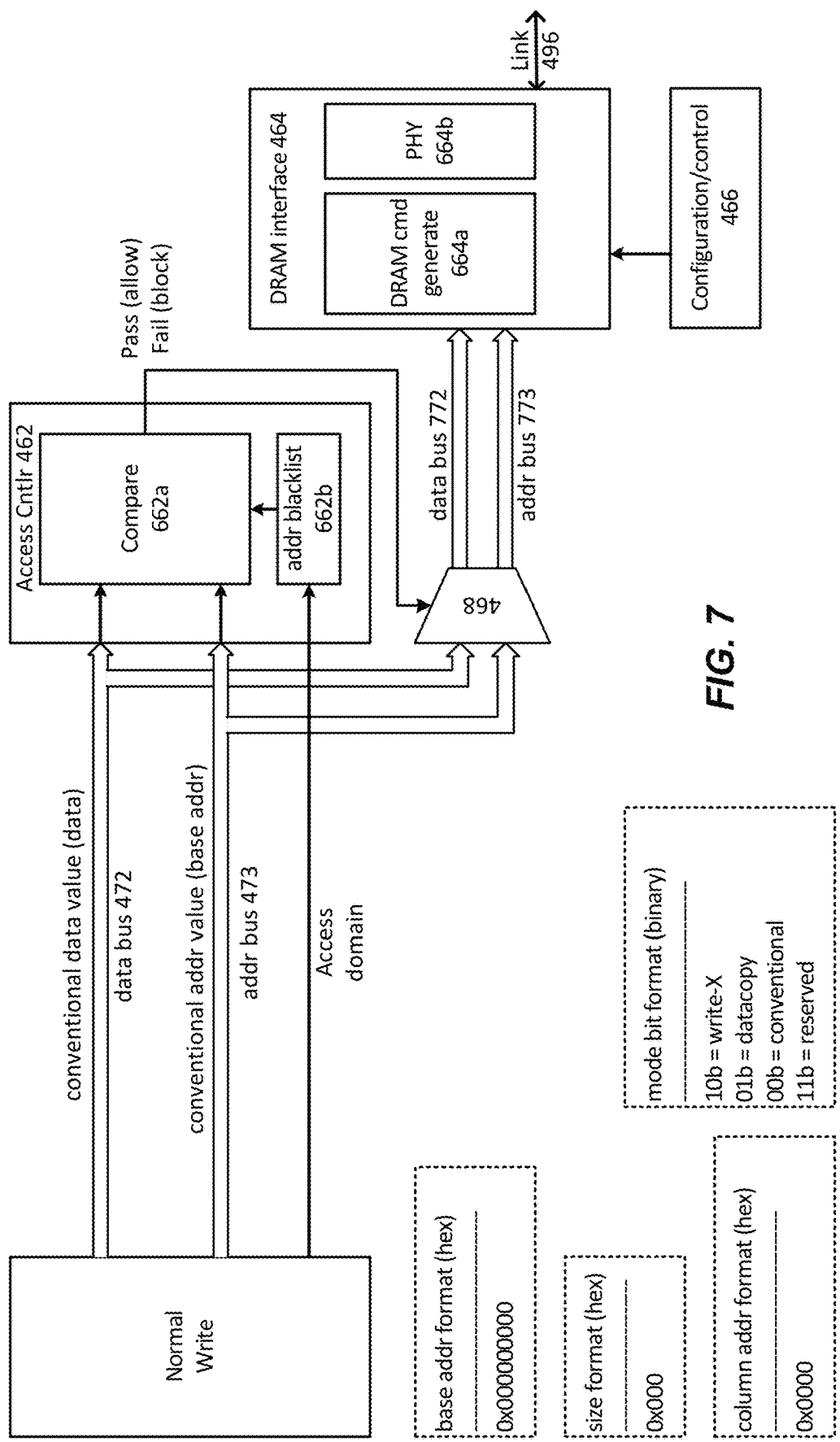
FIG. 7 illustrates a diagram of the apparatus showing that conventional access control can also be performed.

It should be noted that the host 400 may also be configured to perform the conventional access control, i.e., control on the data path 471, e.g., for direct access commands such as normal writes. This is illustrated in FIG. 7. In this instance, the comparator 662a may compare the target address expressed on the data path address bus 473 with the address blacklist 662b to determine whether access is to allowed or blocked. Again, context information may be taken into account. The comparator 662a may enable/disable the path gate 468 depending on the determination to allow/block the expression of the data and address to the data and address busses 772, 773. If the path gate 468 is enabled, the DRAM command generator 664a may generate the appropriate direct access command (e.g., normal write) in the protocol and format understandable by the DRAM device, and the PHY interface 664b may transmit the generated command. For example, the transaction may occur as illustrated in FIG. 1.

Figure 8:
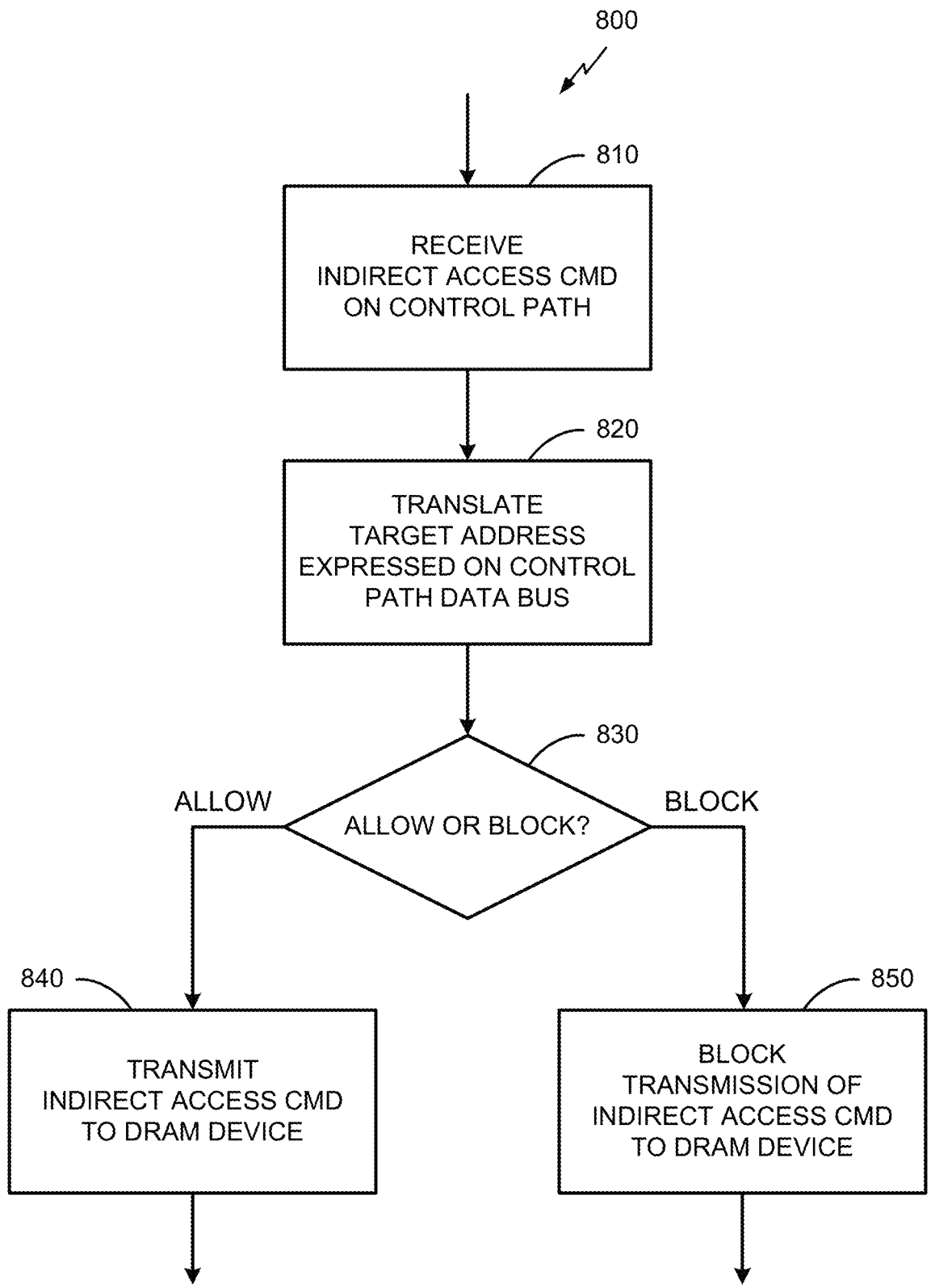
FIG. 8 illustrates a flow chart of an example method performed by the host of the apparatus of FIGS. 4-7.

FIG. 8 illustrates a flow chart 800 of an example method performed by the host 400. It should be noted that not all illustrated blocks of FIG. 8 need to be performed, i.e., some blocks may be optional. Also, the numerical references to the blocks in FIG. 8 should not be taken as requiring that the blocks should be performed in a certain order. Indeed, some blocks may be performed concurrently.

In block 810, an EE controller 480-k may receive an indirect access command (e.g., write-x, datacopy0) on the control path 476. Recall that control path 476 may comprise the control path data bus 477 and the control path address bus 478. Also recall that the target address of the indirect access command may be expressed on the control path data bus 477 and NOT on the control path address bus 478. In block 820, the EE controller 480-k may translate the target address.

Further recall that the EE controller 480-k can be one of a plurality of EE controllers 480. Also, the plurality of EE controllers 480 may correspond to a plurality of contexts (e.g., TrustZone 512, HLOS 515, DSP program 422, etc.). The particular EE controller 480-k that responds to translate the target address may be EE controller 480-k that corresponds to the context ID of the indirect access command. The context ID may be one or both of the data value expressed on the control path address bus 478 and/or the access domain information.

In another embodiment, the system may provide only one EE controller 480 for all the different execution engines (TrustZone, HLOS, DSP, etc.) in the SoC 300. In this embodiment, the EE controller 480 may provide the correct access domain information (e.g., ns, ID) to the access controller 462.

In block 830, the DRAM controller 460, and in particular the access controller 462, may determine whether to allow or block the indirect access command based on the translated target address. For example, the access controller 462 may compare the translated target address with information on allowed/disallowed areas of the DRAM device stored in the address blacklist 662b, and allow/disallow the indirect access command based on the comparison. In particular, the access controller 462 may allow/disallow the indirect access command as prepared by the command translator 485 based on the comparison.

If it is determined that the indirect access command is to be allowed, then in block 840, the DRAM controller 460, and in particular the DRAM interface 464, may transmit the indirect access command to the DRAM device over the DRAM link 496. For example, the DRAM command generator 664a may generate a DRAM command corresponding to the indirect access command in a protocol and format understandable by the DRAM device, and the PHY interface 664b may transmit the generated DRAM command to the DRAM device over the DRAM link 496. The DRAM command may be transmitted as signals that are in compliance with one or more of the memory bus standards (e.g., DDR, DDR2, DDR3, DDR4, DDR5, LPDDR, LPDDR2, LPDDR3, LPDDR4, LPDDR5, etc.).

On the other hand, if it is determined in block 830 that the indirect access command is to be blocked, then in block 850, the indirect access command may be blocked from being transmitted.

Figure 9:
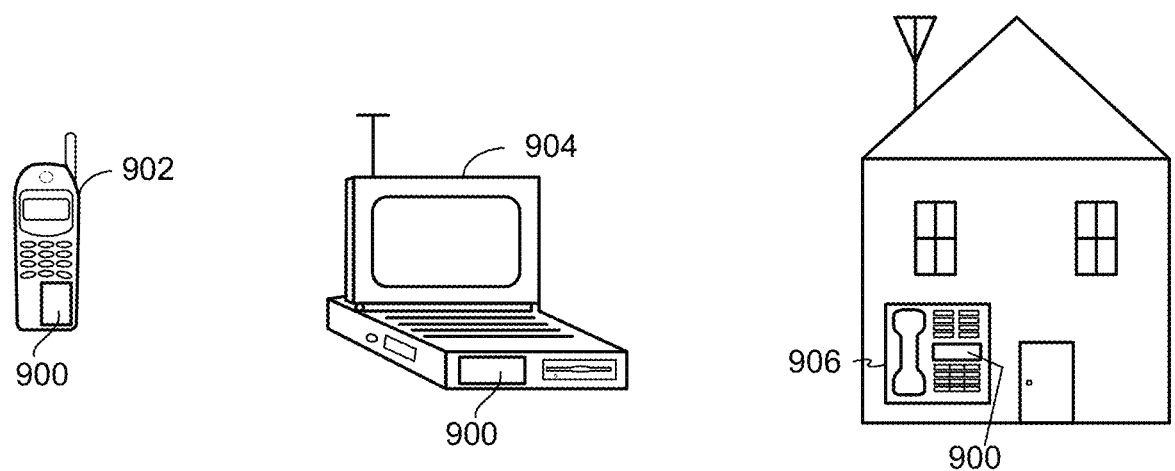
FIG. 9 illustrates examples of devices with a host integrated therein.

FIG. 9 illustrates various electronic devices that may be integrated with the aforementioned apparatuses illustrated in FIGS. 4-7. For example, a mobile phone device 902, a laptop computer device 904, a terminal device 906 as well as wearable devices, portable systems, that require small form factor, extreme low profile, may include an apparatus 900 that incorporates the devices/systems as described herein. The apparatus 900 may be, for example, any of the integrated circuits, dies, integrated devices, integrated device packages, integrated circuit devices, device packages, integrated circuit (IC) packages, package-on-package devices, system-in-package devices described herein. The devices 902, 904, 906 illustrated in FIG. 9 are merely exemplary. Other electronic devices may also feature the apparatus 900 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. An apparatus comprising:
   an execution engine access (EE) controller and a Dynamic Random Access Memory (DRAM) controller,
   wherein the EE controller is configured to:
   receive an indirect access command on a control path comprising a control path data bus and a control path address bus, the indirect access command being a command to access a DRAM device and in which at least a part of the command is received on a path other than on a data path, and
   translate a target address of the indirect access command expressed on the control path data bus, and
   wherein the DRAM controller is configured to:
   determine whether to allow or block the indirect access command based on the translated target address,
   transmit the indirect access command to a DRAM device when it is determined that the indirect access command is to be allowed, and
   block the indirect access command from being transmitted to the DRAM device when it is determined that the indirect access command is to be blocked,
   and
   wherein the DRAM device is coupled to the apparatus over a DRAM link, and
   wherein the indirect access command is transmitted over the DRAM link when it is determined that the indirect access command is to be allowed.

2. The apparatus of claim 1, wherein the DRAM link is a die-to-die link such that the apparatus and the DRAM device are incorporated in single device.

3. The apparatus of claim 1, wherein the indirect access command is a single command that instructs the DRAM device to internally write a constant data value to a plurality of memory locations within the DRAM device.

4. The apparatus of claim 1, wherein the indirect access command is a write-x command or a datacopy0 command.

5. The apparatus of claim 1,
   wherein the DRAM link comprises a plurality of data (DQ) lanes, a clock (CLK) lane, a plurality of command and address (CA) lanes, and a data strobe (DS) lane, and
   wherein the indirect access command transmitted on the DRAM link is such that any value on some or all of the plurality of DQ lanes is ignored by the DRAM device.

6. The apparatus of claim 1,
   wherein the EE controller is one of a plurality of EE controllers of the apparatus,
   wherein the plurality of EE controllers correspond to a plurality of contexts, and
   wherein each EE controller is configured to translate the target address when a context ID of the indirect access command corresponds to the context of that EE controller.

7. The apparatus of claim 6, wherein the context ID includes a value expressed on the control path address bus of the control path.

8. The apparatus of claim 7,
   wherein the indirect access command includes access domain information, and
   wherein the context ID is a combination of the value expressed on the control path address bus and the access domain information.

9. The apparatus of claim 1, further comprising:
   a command translator configured to:
   receive output of the EE controller, and
   prepare the indirect access command for transmission to the DRAM device, wherein the DRAM controller is configured to:
   transmit the prepared indirect access command to the DRAM device when it is determined that the indirect access command is to be allowed, and
   block the prepared indirect access command from being transmitted to the DRAM device when it is determined that the indirect access command is to be blocked.

10. The apparatus of claim 1, wherein each EE controller comprises:
    a command decoder configured to decode the indirect access command received on the control path; and
    a command/address converter configured to:
    modify the decoded command and translate the target address, and
    provide the modified command and the translated target address to the DRAM controller.

11. The apparatus of claim 1,
    wherein the DRAM controller comprises an access controller, a command gate, and a DRAM interface,
    wherein the access controller is configured to:
    determine whether to allow or block the indirect access command based on the translated target address, and
    enable/disable the command gate when it is determined that the indirect access command is to be allowed/blocked,
    wherein the command gate is configured to:
    receive a prepared command corresponding to the indirect access command from a command translator, and
    provide the prepared command to the DRAM interface when enabled, and
    wherein the DRAM interface is configured to issue the prepared command to the DRAM device when provided from the command gate.

12. The apparatus of claim 11,
    wherein the access controller comprises a comparator and an address blacklist,
    wherein the address blacklist is configured to store information regarding allowed/disallowed areas of the DRAM device, and
    wherein the comparator is configured to:
    compare the translated target address with the allowed/disallowed areas stored in the address blacklist, and
    enable/disable the command gate based on the comparison.

13. The apparatus of claim 11,
wherein the DRAM interface comprises a DRAM command generator and a PHY interface,
wherein the DRAM command generator is configured to generate a DRAM command corresponding to the prepared command, the DRAM command being generated in a protocol and format understandable by the DRAM device, and
wherein the PHY interface is configured to transmit the generated DRAM command to the DRAM device over the DRAM link.

14. The apparatus of claim 13, wherein the PHY interface is configured to transmit the generated DRAM command over the DRAM link in compliance with one or more memory bus standards.

15. The apparatus of claim 14, wherein the one or more memory bus standards includes a low power double data rate 5 (LPDDR5) bus protocol.

16. The apparatus of claim 1, further comprising one from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and an automotive vehicle incorporating the EE controller, the DRAM controller, the DRAM link, and the DRAM device.

17. The apparatus of claim 1, wherein the DRAM controller is further configured to:
receive a direct access command on the data path comprising a data path data bus and a data path address bus, a data value of the direct access command being expressed on the data path data bus and a target address of the direct access command being expressed on the data path address bus,
determine whether to allow or block the direct access command based on the target address of the direct access command,
transmit the direct access command to the DRAM device when it is determined that the direct access command is to be allowed, and
block the direct access command from being transmitted to the DRAM device when it is determined that the direct access command is to be blocked.

18. A method comprising:
receiving, by an execution engine access (EE) controller of a host, an indirect access command on a control path comprising a control path data bus and a control path address bus, the indirect access command being a command to access a Dynamic Random Access Memory (DRAM) device and in which at least a part of the command is received on a path other than on a data path;
translating, by the EE controller, a target address of the indirect access command expressed on the control path data bus;
determining, by a DRAM controller of the host, whether to allow or block the indirect access command based on the translated target address;
transmitting, by the DRAM controller, the indirect access command to a DRAM device when it is determined that the indirect access command is to be allowed; and
blocking, by the DRAM controller, the indirect access command from being transmitted to the DRAM device when it is determined that the indirect access command is to be blocked, and
wherein the DRAM device is coupled to the host over a DRAM link, and
wherein the indirect access command is transmitted over the DRAM link when it is determined that the indirect access command is to be allowed.

19. The method of claim 18, wherein the DRAM link is a die-to-die link such that the host and the DRAM device are incorporated in single device.

20. The method of claim 18, wherein the indirect access command is a single command that instructs the DRAM device to internally write a constant data value to a plurality of memory locations within the DRAM device.

21. The method of claim 18, wherein the indirect access command is a write-x command or a datacopy0 command.

22. The method of claim 18,
wherein the DRAM link comprises a plurality of data (DQ) lanes, a clock (CLK) lane, a plurality of command and address (CA) lanes, and a data strobe (DS) lane, and
wherein the indirect access command transmitted on the DRAM link is such that any value on some or all of the plurality of DQ lanes is ignored by the DRAM device.

23. The method of claim 18,
wherein the EE controller is one of a plurality of EE controllers of the host,
wherein the plurality of EE controllers correspond to a plurality of contexts, and
wherein the EE controller translates the target address when a context ID of the indirect access command corresponds to the context of the EE controller.

24. The method of claim 23, wherein the context ID includes a value expressed on the control path address bus of the control path.

25. The method of claim 24,
wherein the indirect access command includes access domain information, and
wherein the context ID is a combination of the value expressed on the control path address bus and the access domain information.

26. The method of claim 18, further comprising:
preparing, by a command translator of the host, the indirect access command for transmission to the DRAM device,
wherein transmitting the indirect access command comprises transmitting the prepared indirect access command to the DRAM device, and
wherein blocking the indirect access command comprises blocking the prepared indirect access command from being transmitted to the DRAM device.

27. The method of claim 18, wherein determining whether to allow or block the indirect access command comprises:
comparing the translated target address with allowed/disallowed areas stored in an address blacklist of the host; and
allowing/blocking the indirect access command based on the comparison.

28. The method of claim 18, transmitting the indirect access command comprises:
generating a DRAM command corresponding to the indirect access command in a protocol and format understandable by the DRAM device; and
transmitting the generated DRAM command to the DRAM device over the DRAM link.

29. The method of claim 28, wherein transmitting the generated DRAM command comprises transmitting the generated DRAM command over the DRAM link in compliance with one or more memory bus standards.

30. The method of claim 29, wherein the one or more memory bus standards includes a low power double data rate 5 (LPDDR5) bus protocol.

31. The method of claim 1, further comprising:
receiving, by the DRAM controller, a direct access command on the data path comprising a data path data bus and a data path address bus, a data value of the direct access command being expressed on the data path data bus and a target address of the direct access command being expressed on the data path address bus,
determining, by the DRAM controller, whether to allow or block the direct access command based on the target address of the direct access command,
transmitting, by the DRAM controller, the direct access command to the DRAM device when it is determined that the direct access command is to be allowed, and
blocking, by the DRAM controller, the direct access command from being transmitted to the DRAM device when it is determined that the direct access command is to be blocked.

32. An apparatus comprising:
an execution engine access (EE) controller and a Dynamic Random Access Memory (DRAM) controller,
wherein the EE controller comprises:
means for receiving an indirect access command on a control path comprising a control path data bus and a control path address bus, the indirect access command being a command to access a DRAM device and in which at least a part of the command is received on a path other than on a data path, and
means for translating a target address of the indirect access command expressed on the control path data bus,
wherein the DRAM controller comprises:
means for determining whether to allow or block the indirect access command based on the translated target address;
means for transmitting the indirect access command to the DRAM device when it is determined that the indirect access command is to be allowed; and
means for blocking the indirect access command from being transmitted to the DRAM device when it is determined that the indirect access command is to be blocked, and
wherein the DRAM device is coupled to the apparatus over a DRAM link, and
wherein the indirect access command is transmitted over the DRAM link when it is determined that the indirect access command is to be allowed.

33. The apparatus of claim 32, wherein the DRAM link is a die-to-die link such that the apparatus and the DRAM device are incorporated in single device.

34. The apparatus of claim 32,
wherein the EE controller is one of a plurality of EE controllers of the apparatus,
wherein the plurality of EE controllers correspond to a plurality of contexts, and
wherein in the EE controller, the means for translating the target address translates the target address when a context ID of the indirect access command corresponds to the context of that EE controller.

35. The apparatus of claim 32, further comprising:
a command translator comprising:
means for receiving an output of the EE controller; and
means for preparing the indirect access command for transmission to the DRAM device,
wherein in the DRAM controller:
the means for transmitting transmits the prepared indirect access command to the DRAM device when it is determined that the indirect access command is to be allowed, and
the means for blocking blocks the prepared indirect access command from being transmitted to the DRAM device when it is determined that the indirect access command is to be blocked.

36. The apparatus of claim 32, wherein the indirect access command is a write-x command or a datacopy0 command.

37. The apparatus of claim 32, wherein the DRAM controller further comprises:
means for receiving a direct access command on the data path comprising a data path data bus and a data path address bus, a data value of the direct access command being expressed on the data path data bus and a target address of the direct access command being expressed on the data path address bus,
means for determining whether to allow or block the direct access command based on the target address of the direct access command,
means for transmitting the direct access command to the DRAM device when it is determined that the direct access command is to be allowed, and
means for blocking the direct access command from being transmitted to the DRAM device when it is determined that the direct access command is to be blocked.

* * * * *